United States Patent
Devos et al.

(10) Patent No.: US 7,102,601 B2
(45) Date of Patent: Sep. 5, 2006

(54) PIXEL MODULE FOR USE IN A LARGE-AREA DISPLAY

(75) Inventors: Bruno Devos, Zulte (BE); Herbert Van Hille, Cambridge, MA (US); Nele Dedene, Houthalen-Helchteren (BE); Patrick Willem, Ostend (BE); Robbie Thielemans, Nazareth (BE)

(73) Assignee: BARCO, naamloze vennootschap, Kortrijk (BE)

( * ) Notice: Subject to any disclaimer, the term of this patent is extended or adjusted under 35 U.S.C. 154(b) by 496 days.

(21) Appl. No.: 10/691,635

(22) Filed: Oct. 24, 2003

(65) Prior Publication Data

US 2005/0052373 A1 Mar. 10, 2005

(30) Foreign Application Priority Data

Sep. 8, 2003 (EP) .................................. 03077824

(51) Int. Cl.
*G09G 3/32* (2006.01)

(52) U.S. Cl. .............................. 345/82; 345/83; 257/88

(58) Field of Classification Search .................. 345/82, 345/83, 76, 6, 36; 257/88, 89, 90; 315/169.3; 438/34; 347/238; 216/25; 349/73, 74
See application file for complete search history.

(56) References Cited

U.S. PATENT DOCUMENTS

| | | |
|---|---|---|
| 5,184,114 A | 2/1993 | Brown |
| 5,410,328 A * | 4/1995 | Yoksza et al. ................. 345/82 |
| 5,513,334 A | 4/1996 | Alexander |
| 5,990,802 A | 11/1999 | Maskeny |
| 6,020,868 A | 2/2000 | Greene et al. |
| 6,816,389 B1 * | 11/2004 | Lutz et al. ................... 361/801 |

FOREIGN PATENT DOCUMENTS

| | | |
|---|---|---|
| EP | 1 052 614 A2 | 11/2000 |
| EP | 1 071 067 A2 | 1/2001 |
| JP | 09-022273 * | 1/1997 |
| WO | 99/41732 A2 | 8/1999 |
| WO | 01/93242 A1 | 12/2001 |

OTHER PUBLICATIONS

Allegro Microsystem: "5821 and 5822 BiMOS II 8 bit serial input latched drivers", 2000, Allegro Microsystsem, Worcester, Massachusetts XP002268893.

* cited by examiner

Primary Examiner—Richard Hjerpe
Assistant Examiner—Abbas Abdulselam
(74) Attorney, Agent, or Firm—Bacon & Thomas

(57) ABSTRACT

A pixel module for use in a large-area display has a cluster of sequentially interconnected similar pixel modules that are driven by a central controller. The module includes pixel elements that have a serial video data bus input, and command input lines that are electrically connected to inputs of a latch. The latch has parallel inputs and outputs which are clocked with a data dock input. Also included are a current driver device for driving the pixels, a first inverter for driving the data clock input, an address input connected to a second inverter, an EEPROM connected to the input port, and a power supply.

17 Claims, 3 Drawing Sheets

PIXEL MODULE FOR USE IN A LARGE-AREA DISPLAY

FIELD OF THE INVENTION

The present invention relates to a pixel module for use in a configurable large-area display system, preferably a large-area light-emitting diode (LED) display system. In particular, the present invention relates to a pixel module for forming two-dimensional or three-dimensional displays of a large-area display system.

BACKGROUND OF THE INVENTION

Conventional incandescent lamps, fluorescent lamps, and neon tubes have long been used to illuminate many large-scale commercial and public signs. The market is now, however, demanding larger displays with the flexibility to customize display sizes and colors which are not possible with these older technologies. As a result, many displays now utilize LEDs in their design because LEDs consume less electrical energy than conventional light sources, and possess a much longer lifetime with lower maintenance costs.

LED technology is currently being applied to large-scale display applications, such as outdoor or indoor stadium displays, large marketing advertisement displays, and mass-public informational displays. Many of these large-scale applications are dynamically reconfigurable under computer control. In addition, some large-scale animated displays that are capable of displaying video imaging are now being produced.

Furthermore, there is a demand in the market not only for two-dimensional (2D) displays, but also for three-dimensional (3D) displays. Technical challenges exist in forming a display system with the flexibility to form various 2D or 3D shapes and, furthermore, in providing control of such a system. What is needed is a system of individual picture elements that are configurable to form large-area LED displays having 2D or 3D shapes.

An example of a configurable large-area display is found in reference to European patent No. 1.057.220, entitled, "Tiled electronic display structure." The EP 1.057.220 patent describes a tiled display device that is formed from display tiles having picture element (pixel) positions defined up to the edge of the tiles. Each pixel position has an organic light-emitting diode (OLED) active area that occupies approximately twenty-five percent of the pixel area. Each tile includes a memory that stores display data and pixel driving circuitry that controls the scanning and illumination of the pixels on the tile. The pixel driving circuitry is located on the back side of the tile and connections to pixel electrodes on the front side of the tile are made by vias that pass through portions of selected ones of the pixel areas that are not occupied by the active pixel material. The tiles are formed in two parts—an electronics section and a display section. Each tile has a glass substrate on the front of the tile. Black matrix lines are formed on the front of the glass substrate. The tiles are joined by mullions that have the same appearance as the black matrix lines.

While the EP 1.057.220 patent describes a configurable large-area display formed of tiled arrays, the dimensions of the individual components, i.e., tiles, are sufficiently large that custom shapes, including 3D shapes, are not possible. Furthermore, the control system of tiled display of EP 1.057.220 patent is not suitable for controlling and reconfiguring individual picture elements.

SUMMARY OF THE INVENTION

It is therefore an object of the invention to provide individual pixel modules for forming custom 2D or 3D shapes in a configurable large-area LED display system.

It is another object of this invention to integrate active devices within individual pixel modules for forming custom 2D or 3D shapes in a configurable large-area LED display system.

It is yet another object of this invention to provide a method of controlling a plurality of individual pixel modules arranged sequentially within a configurable large-area LED display system.

To this end the present invention provides for a pixel module for use in a large-area display, in particular as part of a cluster of a plurality of sequentially interconnected similar pixel modules and driven by a central controller, comprising one or more pixel elements, characterized in that it further comprises a serial video data bus input and one or more command input lines electrically connected to inputs of a latch having parallel inputs and outputs and which is clocked with a data clock input; a current driver device for driving said one or more pixels which is electrically connected to the outputs of latch and to the data clock input and which includes a serial output port for transmitting the serial data to the next pixel module in sequence; a first inverter, the output of which can be used to drive the data clock input of the next pixel module in sequence; a grayscale clock input which is electrically connected to the current driver device and to an output to drive the gray scale input of the next pixel module; an address input which is electrically connected to a second inverter, the output of which can drive the address input of the next pixel module; an EEPROM that is electrically connected to an input port for communication with said central controller, which input port is also connected to an output port for connection with the next pixel module; and a power supply input and output.

The present invention is a LED pixel module for use in a configurable large-area LED display application. The LED pixel module of the present invention integrates active devices therein for providing control thereof by an external controller. A plurality of LED pixel modules of the present invention may be arranged sequentially in any customized 2D and 3D shape under the control of a single external controller.

BRIEF DESCRIPTION OF THE DRAWINGS

With the intention of better showing the characteristics of the invention, hereafter, as an example without any limitative character, a preferred form of embodiment is described of a pixel module according to the invention and a display with such pixel modules, with reference to the accompanying drawings, wherein.

DETAILED DESCRIPTION OF A PREFERRED EMBODIMENT

Figure 1:
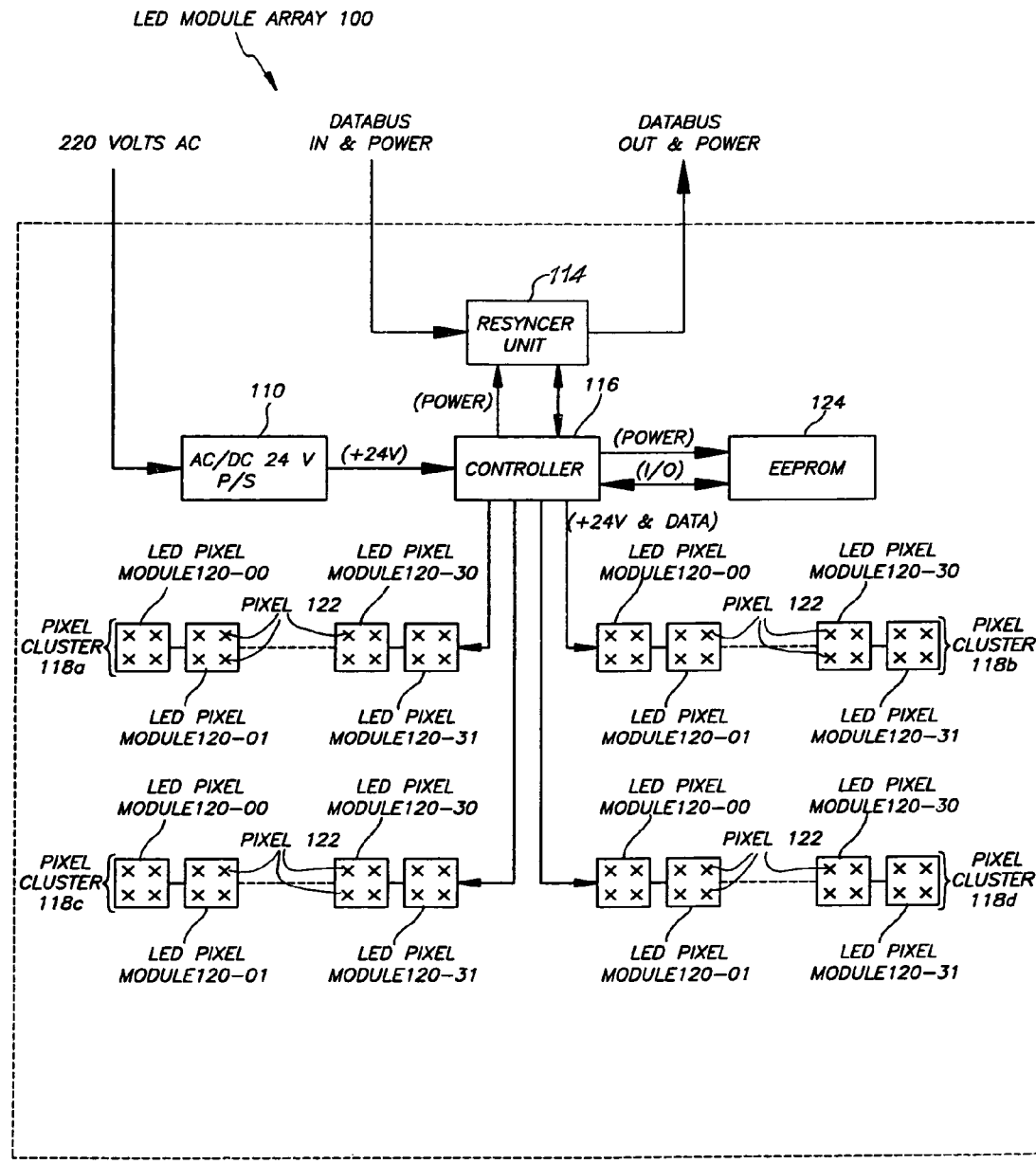
FIG. 1 is a functional block diagram of a LED module array for controlling a plurality of LED pixel modules of the present invention.

FIG. 1 is a functional block diagram of a LED module array 100 in accordance with the invention. LED module array 100 is, for example, a portion of a larger LED display system (not shown) formed of a sequential string of LED module arrays 100. A detailed description of a LED display system is found in reference to another patent application of the same applicant.

While the specific embodiment of the module concept of the present invention is demonstrate by use of LED module array 100, any kind of addressable display technology may be used, be it phosphorescent, electroluminescent, organic/inorganic emissive, reflective or other known display technologies.

LED module array 100 includes an AC-to-DC (AC/DC) converter 110, a resynchronizer (resyncer) unit 114, and a controller 116 driving a plurality of pixel clusters 118 that further include a plurality of LED pixel modules 120. For example, a pixel cluster 118a includes thirty-two LED pixel modules 120, i.e., LED pixel modules 120-00 through 120-31, each of which includes four pixels 122; a pixel cluster 118b includes thirty-two LED pixel modules 120, i.e., LED pixel modules 120-00 through 120-31, each of which includes four pixels 122; a pixel cluster 118c includes thirty-two LED pixel modules 120, i.e., LED pixel modules 120-00 through 120-31, each of which includes four pixels 122; and a pixel cluster 118d includes thirty-two LED pixel modules 122, i.e., LED pixel modules 120-00 through 120-31, each of which includes four pixels 122. Finally, LED module array 100 includes an EEPROM 124.

AC/DC 24V power supply 110 is any standard AC/DC power supply having a universal AC input range and a 24-volt DC output with a maximum output current of, for example, 4 amps for powering resyncer unit 114, controller 116, and LED pixel modules 120. AC/DC 24V Power supply 110 maintains its output voltage at a constant level regardless of input voltage variations as long as the input voltage is within a specified tolerance. An example AC/DC 24V power supply 110 is a switch mode power supply with power factor correction, such as a Hitron model HVP103-240042. There are one or more AC/DC 24V power supplies 110 associated with any given LED module array 100. The number of AC/DC 24V power supplies 110 associated with LED module array 100 depends on the number of pixel clusters 118 contained therein. AC/DC 24V power supply 110 provides power for LED pixel modules 120 wherein a DC-to-DC down-conversion occurs. A more detailed description of the electrical functions of LED pixel modules 120 is found in reference to FIGS. 2 and 3. Additionally, a more detailed description of the physical hardware implementation of LED pixel modules 120 is found in reference to another patent application of the same applicant.

Resyncer unit 114 is a device that receives and re-transmits the serial video and serial control data directly from one LED module array 100 to a next LED module array 100 (not shown) in a sequential string of LED module arrays 100. More specifically, resyncer unit 114 receives a DATABUS IN signal, which is representative of serial video and serial control data, and transmits this data to the next device in sequence via a DATABUS OUT signal. The serial video data is red, green, and blue data containing the current video frame information to be displayed on LED module array 100.

Controller 116 is a standard microprocessor device, such as a Philips 8051 8-bit microcontroller or a Motorola 6816 16-bit microcontroller, or alternatively a custom controller within a field programmable gate array (FPGA) device. Controller 116 manages and distributes the video data by receiving and parsing the DATA IN into specific packets associated with the location of a given LED pixel module 120 of a given LED module array 100 of the larger LED display system. Algorithms running on controller 116 facilitate the process of identifying the portion of the serial DATA IN signal that belongs to its physical portion of the larger LED display system. Additionally, controller 116 manages the pulse width modulation (PWM) associated with driving pixels 122 of each LED pixel module 120.

LED pixel modules 120 each include an array of (k×n) pixels 122 positioned on any user-defined pitch. For example, a 2×2 array of pixels 122 is shown in FIG. 1. Pixels 122 are representative of devices of any addressable display technology, such as standard LEDs or organic light-emitting diode (OLED) devices. Furthermore, each pixel 122 is formed of a red, a green, and a blue sub-pixel, as is well-known. Each LED pixel module 120 includes a set of constant current drivers (not shown) for driving its associated pixels 122. Furthermore, each LED pixel module 120 contains a local storage device (not shown), such as an EEPROM, for storing production data and factory light output measurements as well as color coordinates for each pixel 122 within LED pixel module 120 in the form of (x,y,Y), where x and y are the coordinates of the primary emitters and Y is defined as the brightness. During calibration all values are read from the EEPROM within each LED pixel module 120 and are then used to calculate the correction values. These calculated values are then stored in EEPROM 124 on LED module array 100. EEPROM 124 is any type of electronically erasable storage medium for pervasively storing information. For example, EEPROM 224 may be a Xicor or Atmel model 24C16 or 24C164. A more detailed description of the electrical functions of LED module array 100 is found in reference to another patent application of the same applicant.

In the example shown in FIG. 1, LED pixel modules 120-00 through 120-31 of pixel cluster 118a and LED pixel modules 120-00 through 120-31 of pixel cluster 118b are physically arranged from left to right to form a first contiguous string of sixty-four picture elements. Below this first string, LED pixel modules 120-00 through 120-31 of pixel cluster 118c and LED pixel modules 120-00 through 120-31 of pixel cluster 118d are physically arranged from left to right to form a second contiguous string of sixty-four pixel elements. In this way, a 64×2 array of LED pixel modules 120 is formed. Furthermore, since each LED pixel module 120 contains a 2×2 array of pixels 122, the result is that LED module array 100 contains a 128×4 array of pixels 122. Further details of LED pixel module 120 are found in reference to FIGS. 2 and 3.

With reference to FIG. 1, the operation of LED module array 100 is as follows. Power is applied to LED module array 100. A central controller (not shown) of a larger LED display system provides serial video and control data that is passed from one LED module array 100 to the next via the DATABUS IN and DATABUS OUT of each respective resyncer unit 114. Controller 116 of LED module array 100 receives the video data stream and subsequently parses this information into specific packets associated with the location of the given LED module array 100 within the larger LED display system. Algorithms running on controller 116 facilitate the process of identifying the portion of the serial DATABUS IN signal that belongs to its physical portion of the larger LED display system. Subsequently, controller 116 distributes the appropriate serial video data stream from one LED pixel module 120 to the next LED pixel module 120 (with their associated pixels 122) of each pixel cluster 118 according to the respective x and y color coordinates. This video data transfer operation occurs for each video frame under the control of the central controller of the larger LED display system, thereby creating an image for viewing. The arrangement and maximum number of pixel clusters 118 and associated LED pixel module 120 is not limited to that shown in FIG. 1. LED pixel module 120 and its operation is further detailed in FIGS. 2 and 3.

Figure 2:
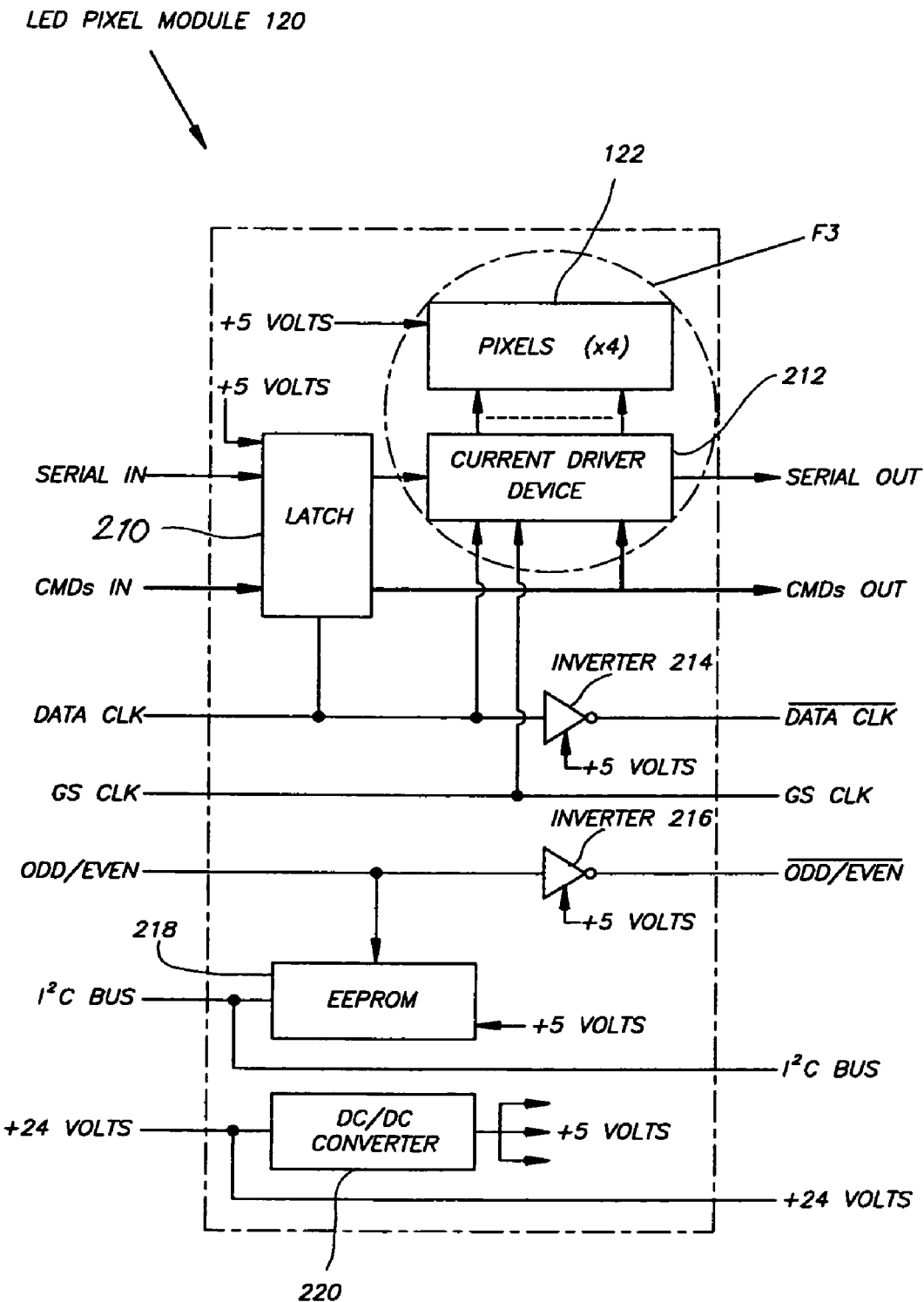
FIG. 2 is a functional block diagram of a LED pixel module in accordance with the invention.

FIG. 2 is a functional block diagram of LED pixel module 120 in accordance with the invention. LED pixel module 120 includes a serial data bus input (SERIAL IN) and a plurality of command input lines (CMDs IN) electrically connected to inputs of a latch 210, which is a conventional multi-bit register having parallel inputs and outputs, and which is clocked with a data clock input (DATA CLK). The serial data and command line outputs of latch 210 are electrically connected to inputs of a current driver device 212 that contains a plurality of constant current drivers (not shown in FIG. 2) for driving a set of pixels 122, as further described in FIG. 3. Furthermore, current driver device 212 contains a plurality of shift registers (not shown in FIG. 2) for building, for example, a 10-bit parallel input to each constant current driver contained therein, also as further described in FIG. 3. The final shift register stage provides a serial output port (SERIAL OUT) for transmitting the serial data to the next LED pixel module 120 in sequence. DATA CLK also feeds an input of current driver device 212 and an input of a conventional inverter 214, the output of which (DATA CLK "not") drives the DATA CLK input of the next LED pixel module 120 in sequence. In this way, the polarity of DATA CLK is reversed as it passes through each LED pixel module 120 along the chain. By reversing the polarity of DATA CLK as it passes through each LED pixel module 120, the signal integrity, i.e., the rise time, fall time, pulse width, and duty cycle of the DATA CLK signal is maintained.

Additionally, a grayscale clock (GS CLK) and an address line (ODD/EVEN) enters LED pixel module 120. GS CLK is electrically connected to an input of current driver device 212 and then exits LED pixel module 120 to drive the GS CLK input of the next LED pixel module 120 in sequence. ODD/EVEN feeds an input of a conventional inverter 216, the output of which (ODD/EVEN "not") drives the ODD/EVEN input of the next LED pixel module 120 in sequence. In this way, the polarity of ODD/EVEN line is reversed as it passes through each LED pixel module 120 along the chain. The ODD/EVEN line is used to gate EEPROM 124.

LED pixel module 120 further includes an EEPROM 218, which is any type of electronically erasable storage medium for pervasively storing information. For example, EEPROM 218 may be a Xicor or Atmol model 24C16 or 24C164. Color coordinates for each pixel 122 within LED pixel module 120 are stored in EEPROM 218 in the form of (x,y,Y), where x and y are the coordinates of the primary emitters and Y is defined as the brightness. Furthermore, all production data and factory light output measurements are stored in EEPROM 218 at the time of manufacture of LED pixel module 120. Furthermore, the ID (passport) of LED pixel module 120, the runtime, and the serial number of LED pixel module 120 are stored in EEPROM 218. Communication with EEPROM 218 is accomplished via controller 116 using a standard I²C bus having a standard two-wire serial data bus protocol, i.e., serial clock line (SCL) and serial data line (SDL). Furthermore, the I²C bus is driven off each LED pixel module 120 to the next LED pixel module 120.

Generally, EEPROM 218 is accessed only during calibration to read measurement data. However, during the general operation of LED pixel module 120 the runtime of LED pixel module 120 is stored within EEPROM 218.

Finally, LED pixel module 120 includes a DC/DC converter 220. DC/DC converter 220 is a conventional DC/DC converter device, which accepts a DC voltage in and performs a voltage down-conversion. DC/DC converter 220 maintains its output voltage at a constant level regardless of input voltage variations as long as the input voltage is within a specified tolerance. In this case, the input to DC/DC converter 220 is 24 volts as shown in FIG. 1, while its output is a DC output voltage of 5.0 volts at up to 250 mA for powering latch 210, current driver device 212, inverter 214, inverter 216, EEPROM 218, and pixels 122, For example DC/DC converter 220 is a discrete designed DC/DC converter existing of a controller device with and integrated switcher, a coil, capacitors and a feedback circuit. The feedback circuit (not shown), which consists of a voltage divider with resistors, regulates DC/DC converter 220 to the desired voltage.

Figure 3:
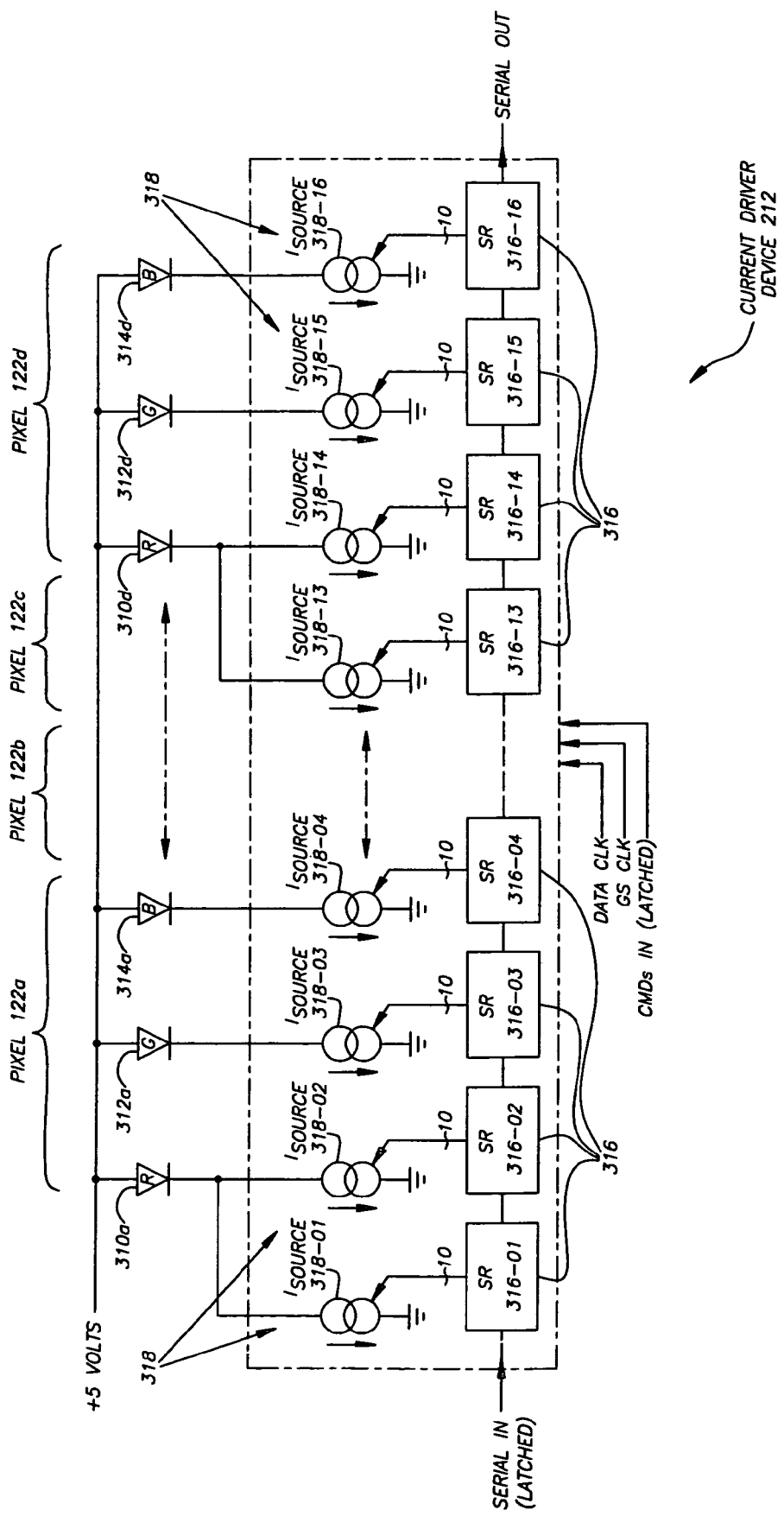
FIG. 3 is a more detailed view of the part indicated with F3 in FIG. 3.

FIG. 3 illustrates a detail F3 of LED pixel module 120 as shown in FIG. 2. More specifically, FIG. 3 shows further details of current driver device 212 and pixels 122 in accordance with the invention. FIG. 3 illustrates that four pixels 122, i.e., a pixel 122a, a pixel 122b, a pixel 122c, and a pixel 122d, are driven by current driver device 212 and each pixel 122 include a red, a green, and a blue sub-pixel. More specifically, pixel 122a includes a red sub-pixel (R) 310a, a green sub-pixel (G) 312a, and a blue sub-pixel (B) 314a; pixel 122b (not shown) includes an R 310b, a G 312b, and a B 314b; pixel 122c (not shown) includes an R 310c, a G 312c, and a B 314c; and pixel 122d includes an R 310d, a G 312d, and a B 314d.

Furthermore, current driver device 212 includes a plurality of shift registers (SRs) 316, each providing a 10-bit word to an associated current source ($I_{SOURCE}$) 318. More specifically, in this example, current driver device 212 includes sixteen SRs 316, i.e., SR 316-01 through SR 316-16, electrically connected to the inputs of sixteen $I_{SOURCES}$ 318, i.e., $I_{SOURCE}$ 318-01 through $I_{SOURCE}$ 318-16, respectively. The serial data is shifted from SR 316-01 to SR 316-16 in sequence from one to another as shown in FIG. 3, i.e., SERIAL IN enters current driver device 212 and feeds an input of SR 316-01, the serial data bus is subsequently shifted from SR 316-01 to SR 316-16 and finally exits current driver device 212 via an output of SR 316-16 that drives SERIAL OUT of LED pixel module 120. Since, in this example, each SR 316 develops a 10-bit parallel output from the serial data input, it therefore takes ten DATA CLK cycles for each SR 316. Thus, a total of 160 DATA CLK cycles are required to form the full 160 bits feeding $I_{SOURCE}$ 318-01 through $I_{SOURCE}$ 318-16. The frequency of DATA CLK is typically set between 1 to 20 MHz, which is a generally determined by the number of pixels 122 (i.e., length of the link) and the frame frequency. The frequency of the GS CLK is typically set by the frame frequency, the bit rate and the number of banks.

The anodes of R 310a, G 312a, B 314a, R 310b, G 312b, B 314b, R 310c, G 312c, B 314c, R 310d, G 312d, and B 314d are electrically connected in common to +5 volts supplied by DC/DC converter 220. The cathodes of each R 310 are driven by two $I_{SOURCES}$ 318, respectively. By contrast, the cathodes of each G 312 are driven by a single $I_{SOURCE}$ 318 and the cathodes of each B 314 are driven by a single $I_{SOURCE}$ 318. This is because the efficiency of the red sub-pixels differs from that of the green and blue; thus, the red sub-pixels require more current than the green and blue sub-pixels. More specifically and in reference to FIG.

3, the cathodes of Rs 310, Gs 312, and Bs 314 are electrically connected to $I_{SOURCE}$s 318 as follows. R 310a is connected to $I_{SOURCE}$s 318-01 and 318-02, G 312a is connected to $I_{SOURCE}$ 318-03, and B 314a is connected to $I_{SOURCE}$ 318-04, thereby forming pixel 122a. R 310b is connected to $I_{SOURCE}$s 318-05 and 318-06, G 312b is connected to $I_{SOURCE}$ 318-07, and B 314b is connected to $I_{SOURCE}$ 318-08, thereby forming pixel 122b. R 310c is connected to $I_{SOURCE}$s 318-09 and 318-10, G 312c is connected to $I_{SOURCE}$ 318-11, and B 314c is connected to $I_{SOURCE}$ 318-12, thereby forming pixel 122c. R 310d is connected to $I_{SOURCE}$s 318-13 and 318-14, G 312d is connected to $I_{SOURCE}$ 318-15, and B 314d is connected to $I_{SOURCE}$ 318-16, thereby forming pixel 122d.

$I_{SOURCE}$s 318 are conventional current sources capable of supplying a constant current, typically in the range of 5 to 50 mA. Examples of commercially available constant-current devices include a Toshiba TB62705 and a Silicon Touch ST2226A. Alternatively, $I_{SOURCE}$s 318 are formed via a custom ASIC device. If the user desires to achieve a color temperature of 6500 K for full white mode, the current capabilities of $I_{SOURCE}$s 318 are set as follows. In this case, each R 310 requires a current of 22 mA, each G 312 requires a current of 14 mA, and each B 314 requires a current of 11 mA to achieve the desired light output. Since all $I_{SOURCE}$s 318 are identical, if all $I_{SOURCE}$s 318 were set up for a 22 mA output to accommodate Rs 310, Gs 312 and Bs 314 would be overdriven and, thus, would have a shortened lifetime. All $I_{SOURCE}$s 318 are instead capable of providing up to 14 mA to accommodate the green sub-pixels, i.e., G 312a, G 312b, G 312c, and G 312d. Two $I_{SOURCE}$s 318 are then connected in parallel to drive each red sub-pixel, i.e., R 310a, R 310b, R 310c, and R 310d, thereby providing a total current capability of 28 mA. However, the current output of the two parallel-connected $I_{SOURCE}$s 318 is digitally corrected via programming to provide 22 Ma to the red sub-pixel. Finally, to accommodate the blue sub-pixels, i.e., B 314a, B 314b, B 314c, and B 314d, the current output of their associated $I_{SOURCE}$s 318 is digitally corrected via programming to provide 11 mA. In summary, for this example, four $I_{SOURCE}$s 318 having an output current capability of up to 14 mA are needed to drive the three sub-pixels of each pixel 122; two $I_{SOURCE}$s 318 for the red sub-pixel, one $I_{SOURCE}$ 318 for the green sub-pixel, and one $I_{SOURCE}$ 318 for the blue sub-pixel, as shown in FIG. 3.

The latched CMDs IN lines and the GS CLK also feed current driver device 212. Typically, three CMDs IN lines control the function of current driver device 212, such as by indicating that the SERIAL IN data is pulse width modulation data (i.e., the displayed information), or by determining whether to blank the output of a given $I_{SOURCE}$ 318 or whether to start generating an output of a given $I_{SOURCE}$ 318. The GS CLK is needed for the PWM of $I_{SOURCE}$s 318, i.e., GS CLK is the output clock).

With reference to FIGS. 1, 2, and 3, the operation of LED pixel module 120 is described as follows. First, +24 volts are supplied to the input of DC/DC converter 220, which subsequently generates +5 volts for distribution to all components of LED pixel module 120. Next, controller 116 (see FIG. 1) distributes the appropriate serial video data stream to LED pixel module 120 via the SERIAL IN line according to the respective x and y color coordinates. Controller 116 also supplies all signal inputs (i.e., CMDs IN, DATA CLK, GS CLK, ODD/EVEN, and I²C bus) to LED pixel module 120. The information of SERIAL IN and CMDs IN is latched within latch 210 via DATA CLK and is subsequently transferred to the input of current driver device 212. More specifically, current driver device 212 interprets the CMDs IN inputs and functions accordingly. Furthermore, SR 316-01 receives the information of SERIAL IN from latch 210, and the serial data is subsequently shifted sequentially from SR 316-01 to SR 316-16 via the action of the DATA CLK, finally exiting current driver device 212 via SERIAL OUT for transmission to the next LED pixel module 120, if one is present. In doing so, each SR 316 develops a 10-bit parallel output from the serial data input. It therefore requires 160 DATA CLK cycles to load the 160 bits feeding $I_{SOURCE}$ 318-01 through $I_{SOURCE}$ 318-16. Depending upon the resulting outputs of $I_{SOURCE}$ 318-01 through $I_{SOURCE}$ 318-16 and the functional state of each $I_{SOURCE}$ 318 based upon CMDs IN, the sub-pixels (i.e., R 310a, G 312a, B 314a, R 310b, G 312b, B 314b, R 310c, G 312c, B 314c, R 310d, G 312d, and B 314d) emit light accordingly. During operation the runtime of LED pixel module 120 is stored within EEPROM 218. The GS CLK serves as the output clock of $I_{SOURCE}$s 318, thereby providing the PWM.

In general, as controller 116 of LED module array 100 provides the serial data from one LED pixel module 120 to the next along any given pixel cluster 118, the polarity of the ODD/EVEN line is toggled. The ODD/EVEN line is distributed to facilitate the I²C bus. During I²C reading or writing, when the ODD/EVEN line is a logic "zero" the sixteen odd LED pixel modules 120 may be accessed. By contrast, when the ODD/EVEN line is a logic "one" the because the DATA CLK is inverted for every other LED pixel module 120 in the sequential string.

In general, the configuration of current driver device 212 is not limited to that shown in FIG. 3 and described above. Current driver device 212 with its SRs 316 and $I_{SOURCE}$s 318 may be customized depending upon specific application requirements. The configuration shown and described above in FIG. 3 is but one example.

Furthermore, in an alternative embodiment, the electrical partitioning of LED pixel module 120, which handles four pixels 122, is not limited to that shown in FIGS. 2 and 3. The electrical design of LED pixel module 120 could, for example, be such that it includes only the electronics for driving a single pixel 122, which includes one red sub-pixel, one green sub-pixel, and one blue sub-pixel.

In summary, LED pixel module 120 of the present invention is suitable for use in a configurable large-area LED display application. LED pixel module 120 integrates active devices therein, such as latch 210, current driver device 212, EEPROM 218, DC/DC converter 220, and pixels 122. A sequential string of LED pixel modules 120 may be daisy-chained together for control and communication purposes under the control of LED module array 100 to form a customizable 2D or 3D pixel cluster 118 for use in a large-area LED display system.

The present invention is in no way limited to the form of embodiment described by way of example and represented in the figures, however, such a pixel module according to the invention for use in a large-area display, can be realized in various forms without leaving the scope of the invention.

The invention claimed is:

1. A pixel module for use in a large-area display, in particular as part of a cluster (118) of a plurality of sequentially interconnected similar pixel modules (120) and driven by a central controller (116), comprising one or more pixel elements (122), characterized in that it further comprises a serial video data bus input (SERIAL IN) and one or more command input lines (CMD's In) electrically connected to inputs of a latch (210) having parallel inputs and outputs and which is clocked with a data clock input (DATA CLK); a current driver device for driving said one or more pixels (122) which is electrically connected to the outputs of latch (210) and to the data clock input (DATA CLK) and which includes a serial output port (SERIAL OUT) for transmitting the serial data to the next pixel module (120) in sequence; a first inverter (214), the output of which (DATA CLK "not") can be used to drive the data clock input (DATA CLK) of the next pixel module (120) in sequence; a grayscale clock (GS CLK) input which is electrically connected to the current driver device (210) and to an output (GS CLK) to drive the gray scale input of the next pixel module (120); an address input (ODD/EVEN) which is electrically connected to a second inverter (216), the output of which (ODD/EVEN "not" ) can drive the address input (ODD/EVEN) of the next pixel module (120); an EEPROM (218) that is electrically connected to an input port ($^2$C BUS) for communication with said central controller (116), which input port is also connected to an output port ($^2$C) for connection with the next pixel module (120); and a power supply (220) input and output.

2. A pixel module according to claim 1, characterized in that the latch (210) is a multi-bit register.

3. A pixel module according to claim 1, characterized in that EEPROM (218) stores the color coordinates for each pixel (122) within pixel module (120).

4. A pixel module according to claim 3, characterized in that the color coordinates are stored in the form of (x,y, Y), where x and y are the coordinates of the primary emitters an Y is the brightness.

5. A pixel module according to claim 1, characterized in that EEPROM (218) contains production data and factory light output measurement data at the time of manufacture of pixel module (120).

6. A pixel module according to claim 1, characterized in that EEPROM (218) contains the identification data, the runtime, and the serial number of pixel module (120).

7. A pixel module according to claim 1, characterized in that communication between EEPROM (218) and the central controller (116) is accomplished using an I$^2$C bus.

8. A pixel module according to claim 7, characterized in that said I$^2$C bus has a standard two wire serial data bus protocol.

9. A pixel module according to claim 7, characterized in that the I$^2$C bus has a serial clock line and a serial data line.

10. A pixel module according to claim 1, characterized in that the power supply comprises a DC/DC converter that provides a DC voltage output for powering latch (210), current driver device (212), first and second inverters (214-216), EEPROM (218), and pixels (122).

11. A pixel module according to claim 1, characterized in that each pixel (122) includes respectively a red sub-pixel (310), a green sub-pixel (312)and a blue sub-pixel (314), which are separately driven by the current current driver device (212).

12. A pixel module according to claim 11, characterized in that each sub-pixel (310-312-314) is driven by at least one current source (318) of which the input is connected to an associated shift register (316).

13. A pixel module according to claim 12, characterized in that each red sub-pixel (310) is driven by at least two current sources (318) which are each connected to an associated shift register (316).

14. A pixel module according to claim 12 or 13, characterized in that the shift registers (316) of the current driver device are sequentially interconnected, whereby the first shift register (316-01) in the sequence is connected to the latched serial data bus input (SERIAL IN) and the last shift register (316-16) in the sequence is connected to the serial output port (SERIAL OUT) of the pixel module (120).

15. A pixel module according to claim 12 or 13, characterized in that the current sources (318) are constant current devices of which the output current can be digitally corrected.

16. A pixel module according to claim 12 or 13, characterized in that the current sources (318) are formed via a custom ASIC device.

17. A pixel module according to claim 1, characterized in that the frequency of the data clock input (DATA CLK) is set between 1 to 20 MHz.

* * * * *